(12) United States Patent  
Kanic

(10) Patent No.: US 7,942,946 B2  
(45) Date of Patent: May 17, 2011

(54) OIL SEPARATOR WITH RAISED HOLES IN PERFORATED TUBE

(75) Inventor: David J. Kanic, Westville, IN (US)

(73) Assignee: Sullair Corporation, Michigan City, IN (US)

( * ) Notice: Subject to any disclaimer, the term of this patent is extended or adjusted under 35 U.S.C. 154(b) by 190 days.

(21) Appl. No.: 12/445,595

(22) PCT Filed: Dec. 26, 2006

(86) PCT No.: PCT/US2006/049298
§ 371 (c)(1),
(2), (4) Date: Apr. 15, 2009

(87) PCT Pub. No.: WO2007/084244
PCT Pub. Date: Jul. 26, 2007

(65) Prior Publication Data
US 2010/0212270 A1    Aug. 26, 2010

(51) Int. Cl.
*B01D 50/00* (2006.01)
(52) U.S. Cl. ............... 55/320; 55/332; 55/428; 55/462

(58) Field of Classification Search ............ 55/318, 55/320, 332, 428, 462
See application file for complete search history.

(56) References Cited

U.S. PATENT DOCUMENTS

| 4,482,364 A | 11/1984 | Martin et al. |
| 4,597,871 A | 7/1986 | Okouchi et al. |
| 5,480,465 A | 1/1996 | Cox |
| 6,168,647 B1 | 1/2001 | Perry, Jr. et al. |
| 6,887,290 B2 * | 5/2005 | Strauser et al. ............ 55/283 |

OTHER PUBLICATIONS

Search Report and Written Opinion mailed on Oct. 12, 2007 for PCT/US2006/49298.
International Preliminary Report on Patentability mailed on Jul. 31, 2008 for PCT/US2006/49298.

* cited by examiner

*Primary Examiner* — Robert A Hopkins
(74) *Attorney, Agent, or Firm* — Carlson Gaskey & Olds

(57) ABSTRACT

A gas/oil separator is provided, wherein a pre-separator tube has an upper solid portion, and a lower perforated portion. Holes in the lower perforated portion allow a gas stream to move radially inwardly, and to a downstream filter pack. The holes have a raised portion extending radially outwardly, and prevent previously separated oil from being reintroduced into the gas stream.

14 Claims, 5 Drawing Sheets

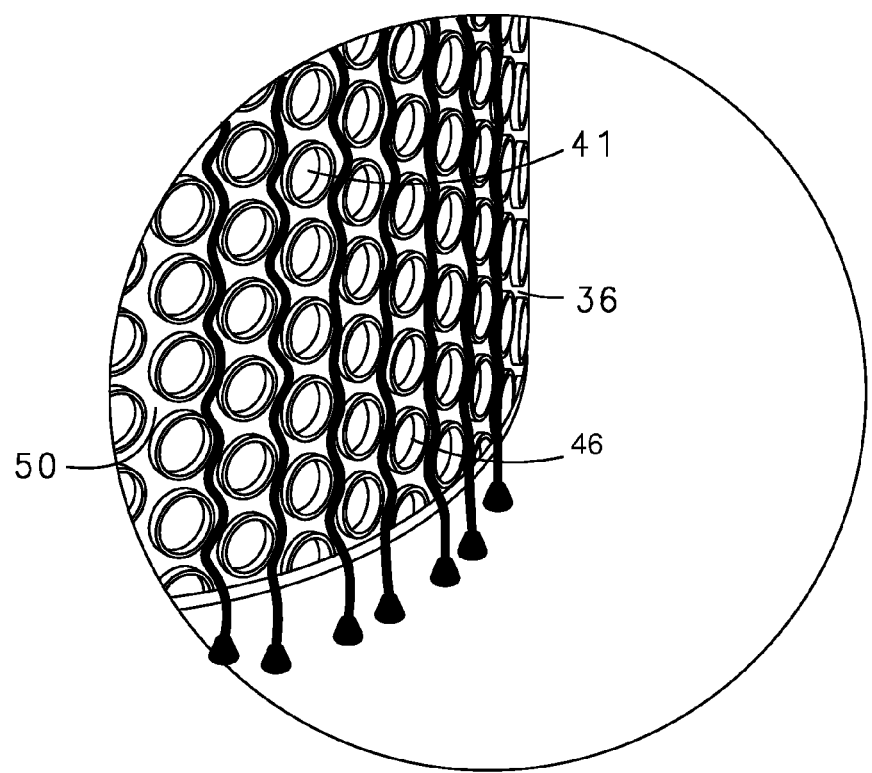
F I G . 4

OIL SEPARATOR WITH RAISED HOLES IN PERFORATED TUBE

This application is a United States National Phase application of PCT Application No. PCT/US2006/049298 filed Dec. 26, 2006.

BACKGROUND OF THE INVENTION

This application relates to an oil separator which serves to remove oil from a gas stream such as air, and wherein a perforated separator tube has extruded perforations to reduce the likelihood of previously separated oil being reintroduced into the gas stream.

Oil separation is required in various gas handling procedures, and in particular, air compression. As part of an air compressor, oil is circulated over moving parts. Some of this oil may be entrained in a compressed air stream. For many reasons, the oil must be removed from the compressed air stream.

Thus, oil separation units are known. In one known type of oil separation unit, air is introduced into an enclosed housing through an inlet. The inlet is positioned in opposition to a solid tube. The solid tube deflects the air stream downwardly toward a perforated tube. The impact of the air stream off of the solid tube removes a high percentage of the oil that is entrained in the air.

The air stream, and any remaining oil still entrained, is directed downstream, and through the perforated tube. The air stream flows through the perforations, and into an interior filter pack. Air passes through the filter pack into an outlet, and then to a downstream use. The perforations serve to smooth the air stream flow In the prior art, the oil which is removed from the solid tube flows downwardly, and over the perforated tube. The prior art perforated tube has been formed as holes in an otherwise cylindrical surface. Thus, the previously removed oil may flow into the hole, or be entrained by air passing into the perforations. Thus, an undesirably high amount of oil reaches the filter pack. This causes the filter pack to become saturated at an undesirably early point, and further reduces the efficiency of the overall oil separator.

SUMMARY OF THE INVENTION

In a disclosed embodiment, an oil separator is provided with a tube having an upper solid wall, and a lower perforated wall. The perforations are formed to have a radially outwardly extending boss or raised portion. The holes may be extruded to form the raised portion. These raised portions provide a dam to prevent any previously separated oil from entering the holes, and further prevent air which is passing into the holes from contacting this previously removed oil. In this manner, the amount of oil in the air which reaches a filter pack is significantly reduced when compared to the prior art.

These and other features of the present invention can be best understood from the following specification and drawings, the following of which is a brief description.

BRIEF DESCRIPTION OF THE DRAWINGS

FIG. 4 is an enlarged perspective view of a portion of the present invention

DETAILED DESCRIPTION

Figure 1:
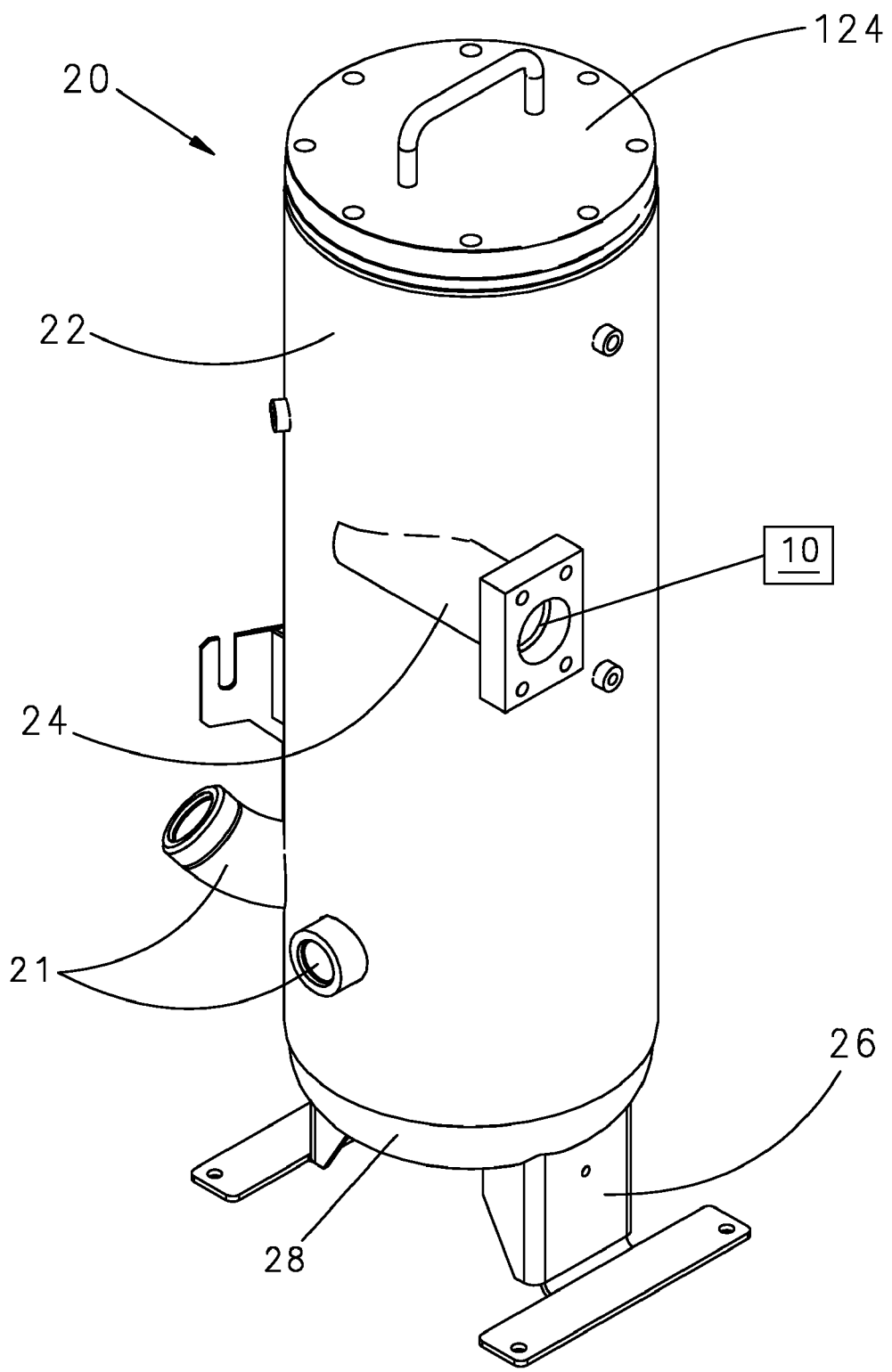
FIG. 1 is a perspective view of a gas/oil separator

A gas/oil separator 20 is illustrated in FIG. 1, and has an outer housing 22. An inlet 24 is connected to a source of air and entrained oil, such as an air compressor 10. An upper cap 124 encloses the housing 22, and a stand 26 mounts the housing. A lower cap 28 provides the other end of the housing. Connections 21 may be provided for oil supply, sensors, etc.

Figure 2:
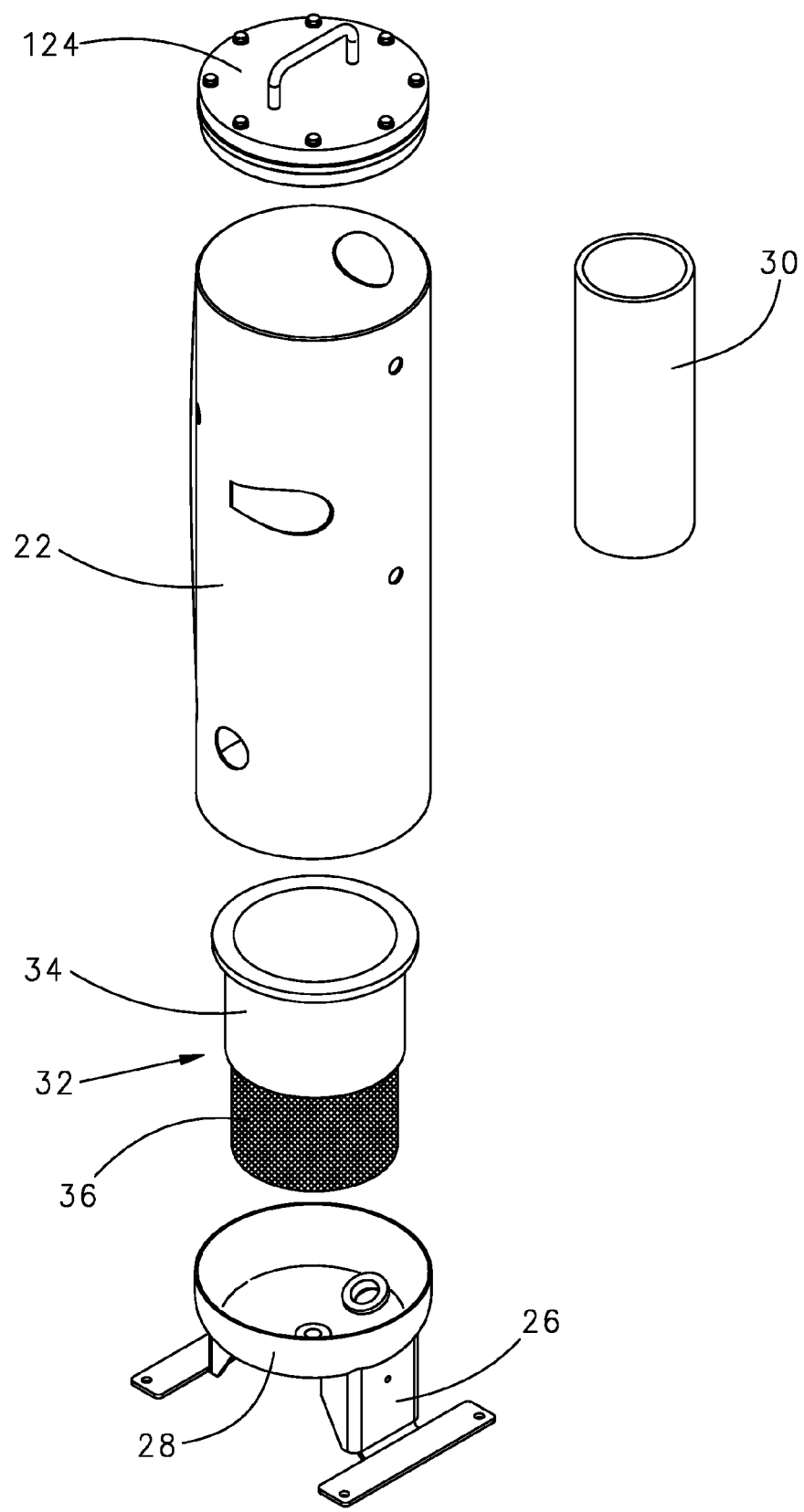
FIG. 2 is an exploded view of the FIG. 1 separator
Figure 3:
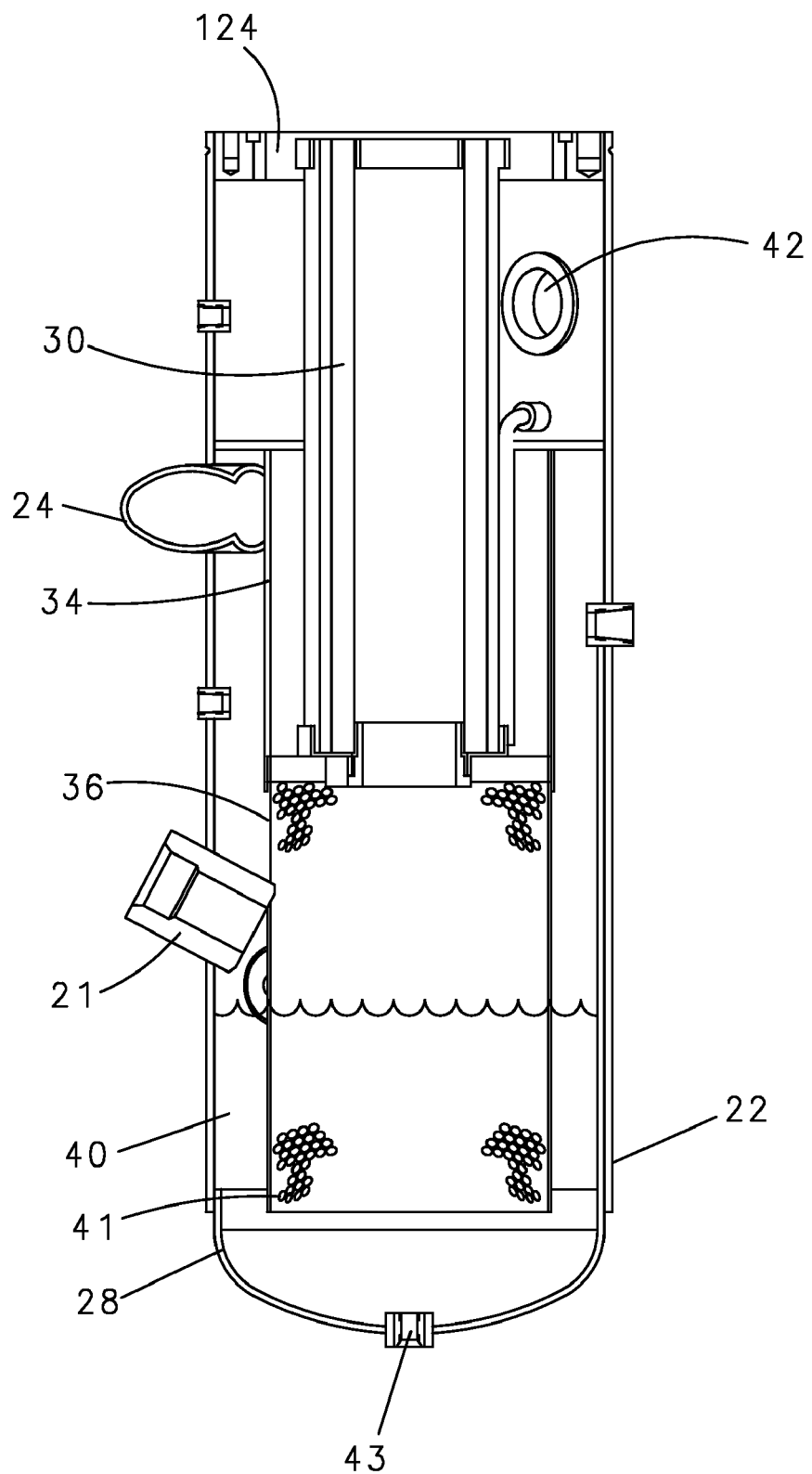
FIG. 3 is a cross-sectional view through the inventive separator

FIG. 2 is an exploded view, and shows internal structure including a filter pack 30 which is received within a pre-separator tube 32. Pre-separator tube 32 includes an upper solid portion 34 and a lower perforated portion 36. As shown in FIG. 3, a gas, such as air and an entrained oil, enters through the inlet 24 and impacts off of the solid tube portion 34. This removes a good deal of the entrained oil from the air stream, and that removed oil flows vertically downwardly toward a sump 40. Openings not seen in this figure allow the air and oil to flow downwardly. The air stream, and any remaining entrained oil, flows vertically downwardly, and through holes 41 in lower perforated portion 36. This air stream then passes vertically upwardly through filter pack 30, and radially outwardly to an outlet 42.

As shown in FIG. 3, an oil outlet 43 provides an oil drain such that oil can be returned, such as to an air compressor As can be appreciated from FIG. 4, each of the plurality of holes 41 have a boss or raised portion 46 extending outwardly of a nominal face 50. This creates a path for the flow of returning oil, such that the returning oil does not move into the holes 41, or be impacted by air flowing into the holes 41.

Figure 5:
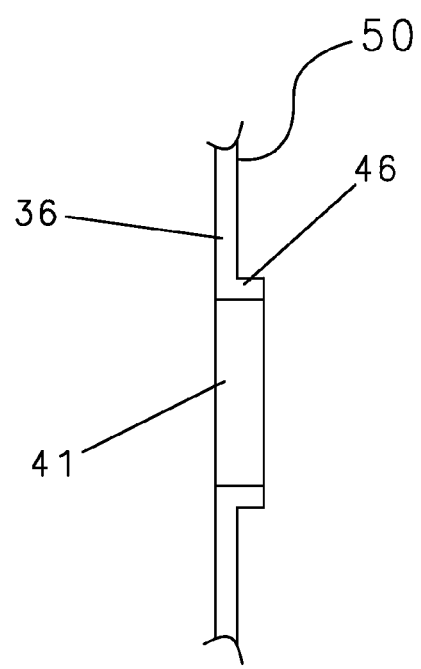
FIG. 5 is a cross-sectional view through one perforation in the inventive separator tube.

As shown in FIG. 5, the raised portion 46 extends outwardly and away from the nominal face 50. In disclosed embodiments, the height, or the distance the raised portion 46 extends away from the nominal face 50 is between 20 and 40 percent of the diameter of the hole 50. In actual selected dimensions, the height was between 25 and 30 percent of the diameter. In actual production embodiments, the hole diameter was selected to be 0.265", and the height was between 0.075" and 0.090"

In disclosed embodiments, a tube is made from a steel, and in particular a mild steel. The tube has an "open area" of approximately 40 percent in actual embodiments. Of course, other open percentages would come within the scope of this invention.

In disclosed embodiments, the raised portions are extruded outwardly from the area of the hole. Various other manufacturing techniques can be utilized to form the raised portions By providing perforations which include the boss or raised portion, the present invention reduces the reintroduction of previously separated oil into the air stream. In this manner, the air stream reaching the filter pack 30 is much cleaner than in the prior art, and the filter pack 30 will last longer than is the case in the prior art.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An oil separator unit comprising:
   a housing, said housing having an inlet port and an outlet port;
   a pre-separator tube positioned within said housing, said pre-separator tube having an upper portion, and a perforated lower portion, said lower portion being positioned vertically lower than said upper portion, and said inlet port directing a gas stream against an outer periphery of said upper portion;
a filter pack positioned within said housing, and an airflow path provided from said inlet, radially inwardly through holes in said lower portion, through said filter pack, and then to said outlet; and
said holes including a raised portion extending radially outwardly from a nominal face of the lower portion, and providing a dam to limit oil moving into said holes.

2. The gas separator as set forth in claim 1, wherein said upper portion and said lower portion are attached together.

3. The gas separator as set forth in claim 1, wherein said filter pack is at least partially received within said upper portion.

4. The gas separator as set forth in claim 1, wherein an oil sump is defined in said housing, and said lower portion being at least partially within said oil sump.

5. The gas separator as set forth in claim 4, wherein said raised portions around said holes provide a torturous path for oil returning to the sump.

6. The gas separator as set forth in claim 1, wherein said raised portion extends completely around said holes.

7. The gas separator as set forth in claim 1, wherein said holes having a diameter, and said raised portion extending radially outwardly from a nominal outer face of the lower portion for a height, the ratio of the height to the diameter being between 0.2 and 0.4.

8. An oil separator unit comprising:
a housing, said housing having an inlet port and an outlet port;
a pre-separator tube positioned within said housing, said pre-separator tube having an upper portion, and a perforated lower portion, said lower portion being positioned vertically lower than said upper portion, and said inlet port directing a gas stream against an outer periphery of said upper portion. said upper portion and said lower portion being attached together;
a filter pack positioned within said housing, and a gas flow path provided from said inlet port, radially inwardly through holes in said lower portion, through said filter pack, and then to said outlet port, said filter pack is at least partially received within said upper portion; and
said holes including a raised portion extending radially outwardly from a nominal face of the lower portion, and providing a dam to prevent oil moving into said holes, an oil sump being defined in said housing, said raised portions around said holes provide a torturous path for oil returning to the sump.

9. The gas separator as set forth in claim 8, wherein said raised portion extends completely around said holes.

10. The gas separator as set forth in claim 8, wherein said holes having a diameter, and said raised portion extending radially outwardly from a nominal outer face of the lower portion for a height, the ratio of the height to the diameter being between 0.2 and 0.4.

11. A pre-separator tube for use in an oil separator unit comprising:
a tube body, said tube body having a solid upper portion, and a perforated lower portion, said lower portion being positioned vertically lower than said upper portion; and
said lower portion having a plurality of holes, with said holes including a raised portion extending radially outwardly from a nominal face of the lower portion, and providing a dam to limit oil moving into said holes.

12. The pre-separator tube as set forth in claim 11, wherein said raised portions around said holes provide a torturous path for oil returning to the sump.

13. The pre-separator tube as set forth in claim 11, wherein said raised portion extends completely around said holes.

14. The pre-separator tube as set forth in claim 11, wherein said holes having a diameter, and said raised portion extending radially outwardly from a nominal outer face of the lower portion for a height, the ratio of the height to the diameter being between 0.2 and 0.4.

\* \* \* \* \*